United States Patent [19]

Miyake et al.

[11] Patent Number: 5,426,730
[45] Date of Patent: Jun. 20, 1995

[54] METHOD AND APPARATUS FOR DISPLAYING SEQUENTIAL FUNCTION CHART ELEMENTS

[75] Inventors: Yoshiyuki Miyake, Takatsuki; Tadashi Sakaguchi, Shiga, both of Japan

[73] Assignee: Omron Corporation, Kyoto, Japan

[21] Appl. No.: 188,749

[22] Filed: Jan. 31, 1994

Related U.S. Application Data

[63] Continuation of Ser. No. 577,377, Sep. 4, 1990, abandoned.

[30] Foreign Application Priority Data

Sep. 4, 1989 [JP] Japan ................... 1-228985
Sep. 14, 1989 [JP] Japan ................... 1-238764

[51] Int. Cl.$^6$ ............................................. G06F 3/00
[52] U.S. Cl. ................................. 395/159; 395/139; 395/161
[58] Field of Search ............ 395/153, 154, 155–161, 395/139–140, 700, 650, 575, 600, 800, 775, 200; 364/188, 146–147; 345/117–120

[56] References Cited

U.S. PATENT DOCUMENTS

| | | | |
|---|---|---|---|
| 4,315,315 | 2/1982 | Kossiakoff | 395/140 |
| 4,445,169 | 4/1984 | Wakita et al. | 364/147 |
| 4,449,180 | 5/1984 | Ohshima et al. | 364/147 |
| 4,455,619 | 6/1984 | Masui et al. | 395/160 |
| 4,546,435 | 10/1985 | Herbert et al. | 395/700 |
| 4,656,603 | 4/1987 | Dunn | 340/721 X |
| 4,697,231 | 9/1987 | Boytor et al. | 364/188 |
| 4,851,985 | 7/1989 | Burror et al. | 364/184 |
| 4,901,221 | 2/1990 | Kodosky et al. | 395/159 |
| 4,984,152 | 1/1991 | Muller | 395/153 |
| 5,001,697 | 3/1991 | Torres | 340/721 X |

FOREIGN PATENT DOCUMENTS

| | | | |
|---|---|---|---|
| 0198170 | 10/1986 | European Pat. Off. | G06F 11/00 |
| 0224752 | 6/1987 | European Pat. Off. | G05B 19/04 |
| 0362392 | 4/1990 | European Pat. Off. | G05B 19/04 |

OTHER PUBLICATIONS

Mosley, "Lab View Upgrade Reduces Execution Time and Enhances Editing and Graphics Controls", EDN, 9/15/88, p. 134.

Edel, "The Tinkertoy Graphical Programming Environment", IEEE Trans. on Software Eng., 8/88, pp. 1110–1115.

*Primary Examiner*—Mark R. Powell
*Assistant Examiner*—John E. Breene
*Attorney, Agent, or Firm*—Dickstein, Shapiro & Morin

[57] ABSTRACT

A programmable monitoring unit which is adapted for simplifying the programming and display of user programs in a programmable controller using a sequential function charting technique. In a first embodiment, the display of the SFC data is easily compressed such that a combined display element chart is accessed by inputting a first and a second display element and a combined element representing the first and second inputs are displayed in a single display area. In a second embodiment, the present invention provides a means for readily displaying the functional status and changes of transactions based on a program's operational cycles in order to facilitate the debugging of the program.

9 Claims, 7 Drawing Sheets

METHOD AND APPARATUS FOR DISPLAYING SEQUENTIAL FUNCTION CHART ELEMENTS

This is a continuation of application Ser. No. 07/577,377, filed Sep. 4, 1990, now abandoned.

FIELD OF THE INVENTION

The present invention relates to a programmable monitor unit which is used for writing programmable controller (PC) programs using a sequential functional chart (SFC) format.

BACKGROUND OF THE INVENTION

In conventional programmable monitors that are associated with PCs, programs are developed by referring to standard symbols which form the fundamental elements of the Sequential Function Chart (SFC). Examples of such elements as shown in FIG. 4 include steps 10, transitions 12, converges 14 or deconverges to name a few. These elements are used as building blocks to represent a program on a display. In addition to employing these elements, individual numbers, as shown in the flow chart 20 illustrated in FIG. 5, can be employed as well. However, only one fundamental element can be displayed in each display area 110a or 110b (area a) which lines up vertically on the flow chart 20.

As a result, present programmable monitors have several disadvantages. First, in order to use the SFC format the user is required to make a large number of key operations to move through the particular SFC transactions identified on the display. Second, the resulting display area is inefficiently used and contains many blank spaces. Third, significant differences in the display size results. For a program having many converges a large amount of space is taken up in the display and therefore the display means becomes even less efficient than for a program having few converges. Thus, complex programs exhibiting a large number of converges become burdensome for the user to develop and cumbersome for the user to review.

A further problem with present programmable monitors is that when a user wishes to debug his program, the system will often limit the user to a display of the functional status of each of the contacts and/or channels effected by the program that are designated by the user. An example of this deficiency is shown in FIG. 11, which represents a typical display 600 which shows the status of a plurality of contacts 822. The status of each of the contacts 822 is represented either by an on-state 826 or an off-state 828 condition in a time chart 825. Sampling times represented on line 832 can be only conventional sampling times such as microseconds, milliseconds, seconds or alternatively cycles. In addition, the display also shows the status of each channel 824. The status is typically represented in hexadecimal format 830 coordinated by the designated time periods 832.

The disadvantage of the display of FIG. 11 is that a conventional monitoring unit can only display the status of the contacts or channels individually. The status of transactions represented on a respective SFC diagram, however, are not shown. To determine the SFC status, therefore, the user must analyze the channel and contact data and correlate that data with the SFC transaction. Such an effort becomes extremely burdensome for the programmer. Moreover, it may ultimately limit that programmer's understanding of the program only to its microscopic effects rather than provide that user with an understanding of the program's effects at the transaction level. As a result, it becomes difficult for the user to debug a program efficiently, thereby eliminating the advantages of structural programming techniques, such as SFC.

SUMMARY AND OBJECTS OF THE INVENTION

In view of the foregoing, therefore, there exists a need in the art for a more practical monitoring system that can be used both for debugging a program using an SFC format in a PC environment and for displaying the SFC elements on a display monitor in a compressed and efficient fashion. It is therefore a primary object of the invention to provide for a method and apparatus that enables an operator to select designated transactions in a program, such as steps or transitions, that then checks the functional status and changes of the transactions periodically, that stores the functional status and changes in a memory time table and that then displays the information in reference to the memory table. In addition, it is also a primary object of this invention to provide an improved programmable monitor which displays fundamental display elements, such as SFC steps, transitions, converges and deconverges or any other elements as needed in a manner that fully utilizes available display space in an efficient and flexible manner.

More particularly, it is an object of this invention to provide a programmable monitor that is adapted to combine more than one fundamental display element into a single display area.

It is yet an additional object of the invention to provide for an improved monitor which is adapted to designate a combined fundamental element from a combination table in which table positions are defined by standard display elements.

It is still a further object of the invention to provide an apparatus that checks the functional status of SFC transactions periodically during the execution of a program represented by SFC symbols.

It is yet an additional object of the invention to provide for a monitoring system having a memory which is adapted to store the various functional status and changes in a table format which is based upon the operational cycles of the program.

It is still another object of the invention to provide for a monitor unit which is adapted to display various transactions stored in the memory of the system in a time chart format whereby the various transactions represented by the time chart are a function of the operational cycles of the program.

Briefly described, these and other objects of the invention are accomplished in accordance with these apparatus aspects by providing, in a first embodiment, a programmable monitor unit which is adapted to display elements on a monitor screen. The monitor unit includes a display device which is comprised of a plurality of display areas, each respectively representing a single display element. The unit further includes a memory which is adapted to store a matrix of combined display elements which are defined respectively by individual standard display elements. The programmable monitor unit also includes a selecting device which enables an operator to respectively select combined display elements automatically such that the display produces a compressed image formed of combined display elements, each of which are represented in a single respective display area.

The apparatus aspects of the invention are provided for in a second embodiment by a programmable monitor unit which includes a selecting device for designating transactions in a program. The monitor unit includes a system for checking the functional status or changes of transactions periodically during the execution of the program. The system includes a memory unit for storing the sensed functional status and changes in a table format based upon the operational cycles of the program. A display then displays the transactions identified in the table as a time chart that is defined by the operational cycles of the program.

In a first embodiment, the method of the present invention is realized by displaying combined SFC elements to compress the display area. The method consists of the steps of storing a matrix of combined display element which are defined by respective fundamental display elements, selecting the combined display elements from the matrix and then displaying the combined elements wherein each respective combined display element is represented in a single display area of the monitor.

The method of the present invention is carried out in a second embodiment by selecting designated transactions in a program and then checking the functional status and changes of the transactions periodically during the execution of the program. The functional status and changes are stored in a table format based upon the operational cycles and then displayed in a time-chart function defined by the operation cycles.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENTS

Figure 1:
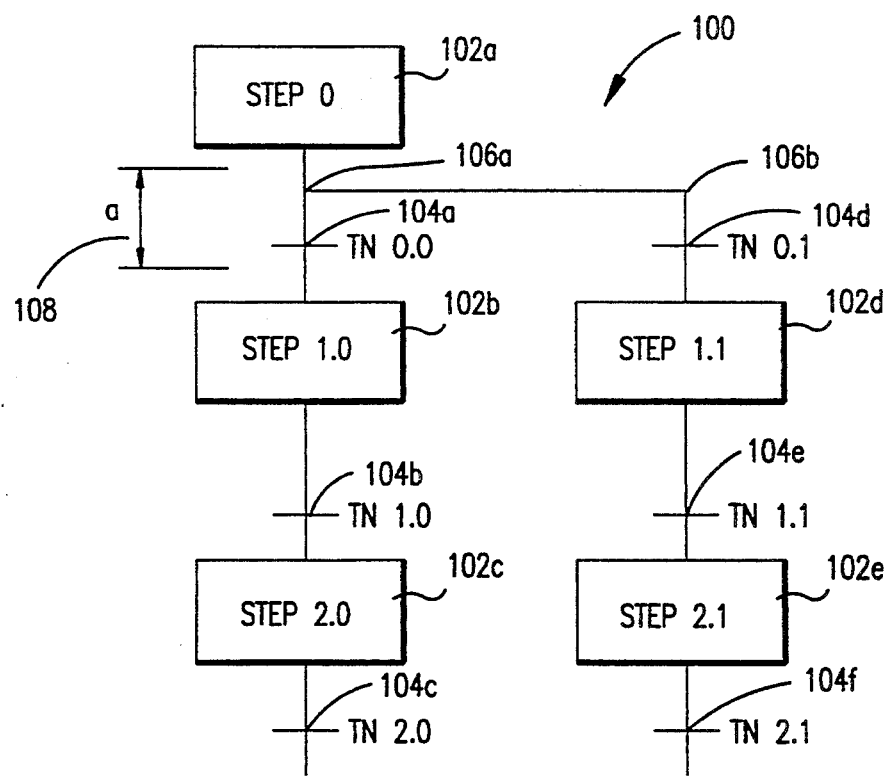
FIG. 1 is a flow chart representing the display of a first embodiment of the present invention.

Referring now in detail to the drawings wherein like parts are designated by like reference numerals throughout, there is illustrated in FIG. 1 a flow chart representing the first embodiment of the invention. In the first embodiment, the programmable monitor for a PC can be used, for example, with a personal computer having a man-machine interface. The man-machine interface works in the following manner: A program is developed through the provision of inputs comprising SFC fundamental elements. These elements are inputted through a keyboard (not shown) whereby the PC then automatically draws the SFC symbol visually on the display. As a result, a program can be easily and quickly developed with a minimum of confusion and complication. As shown in FIG. 1, an example of an SFC display is shown. The display consists of a plurality of steps 102a, 102b, 102c, 102d and 102e, transitions 104a, 104b, 104c, 104d, 104e and 104f, and converges 106a and 106b.

As shown in FIG. 1, one converge 106a and one transition 104a can be compressed into a single display area 108 having the vertical dimension "a". As a result, two display elements such as a converge and transition, can be displayed along a vertical axis in the same display area 108.

Figure 5:
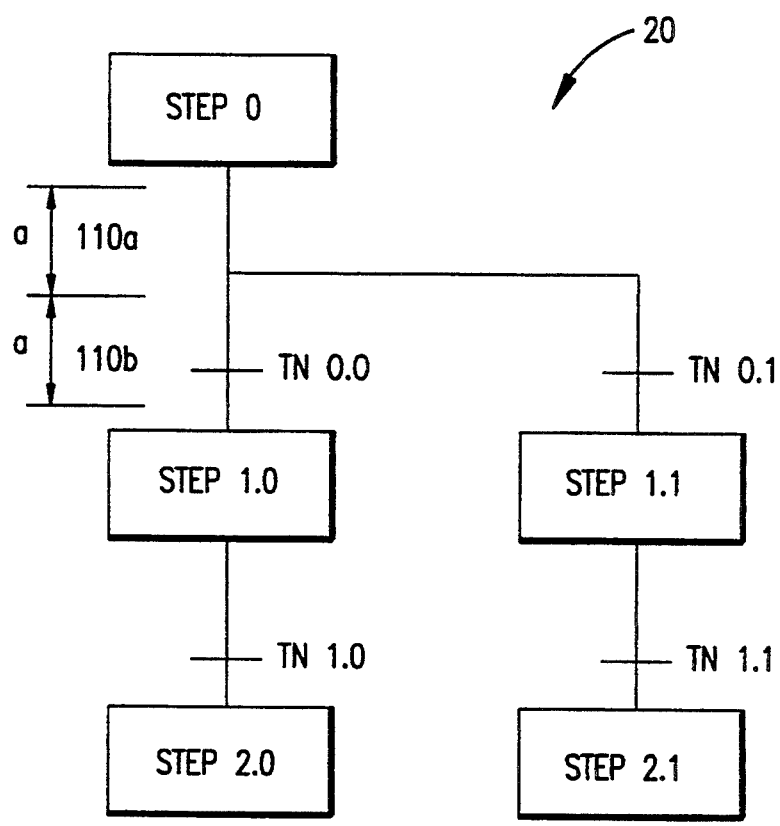
FIG. 5 is a flow chart representing displays utilized in the prior art.

The arrangement shown in FIG. 1 is a significant improvement over the prior art. FIG. 5 represents prior art displays where each display element, such as a step, transition, converge or deconverge is restricted to a single display area 110a and 110b. As a result, the present invention provides significant screen compression over the arrangement of FIG. 5. Specifically, the display in FIG. 1 represents 5 steps, 6 transitions and 2 converges, in other words 13 display elements in the same area. FIG. 5, on the other hand, only displays 5 steps, 4 transitions and 2 converges, in other words 11 display elements within the same area. Such a savings can obviously be significant for complex SFC programs, especially large-scale programs.

Figure 2:
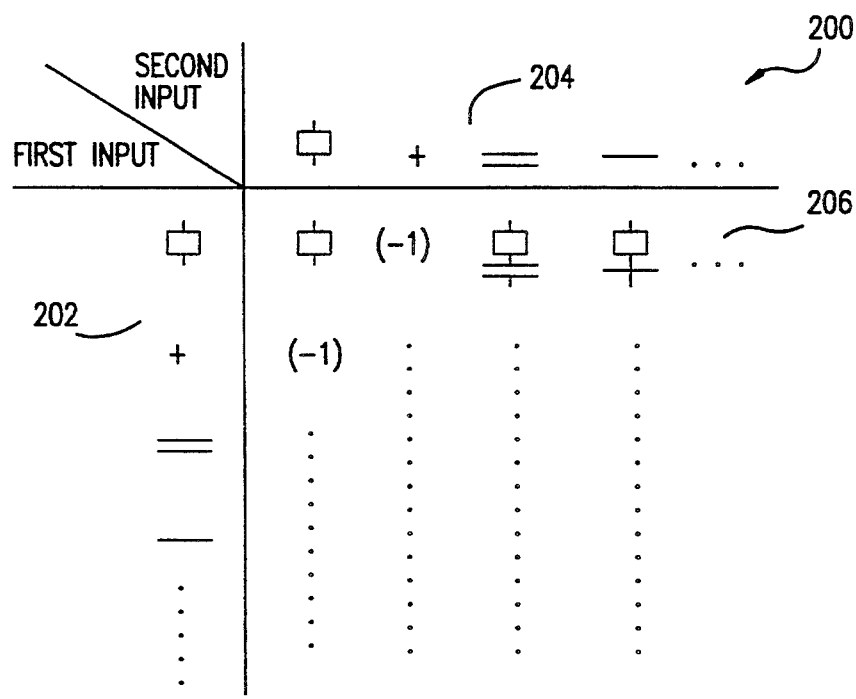
FIG. 2 is a table illustrating the combined display elements used in .the display of FIG. 1.
Figure 3:
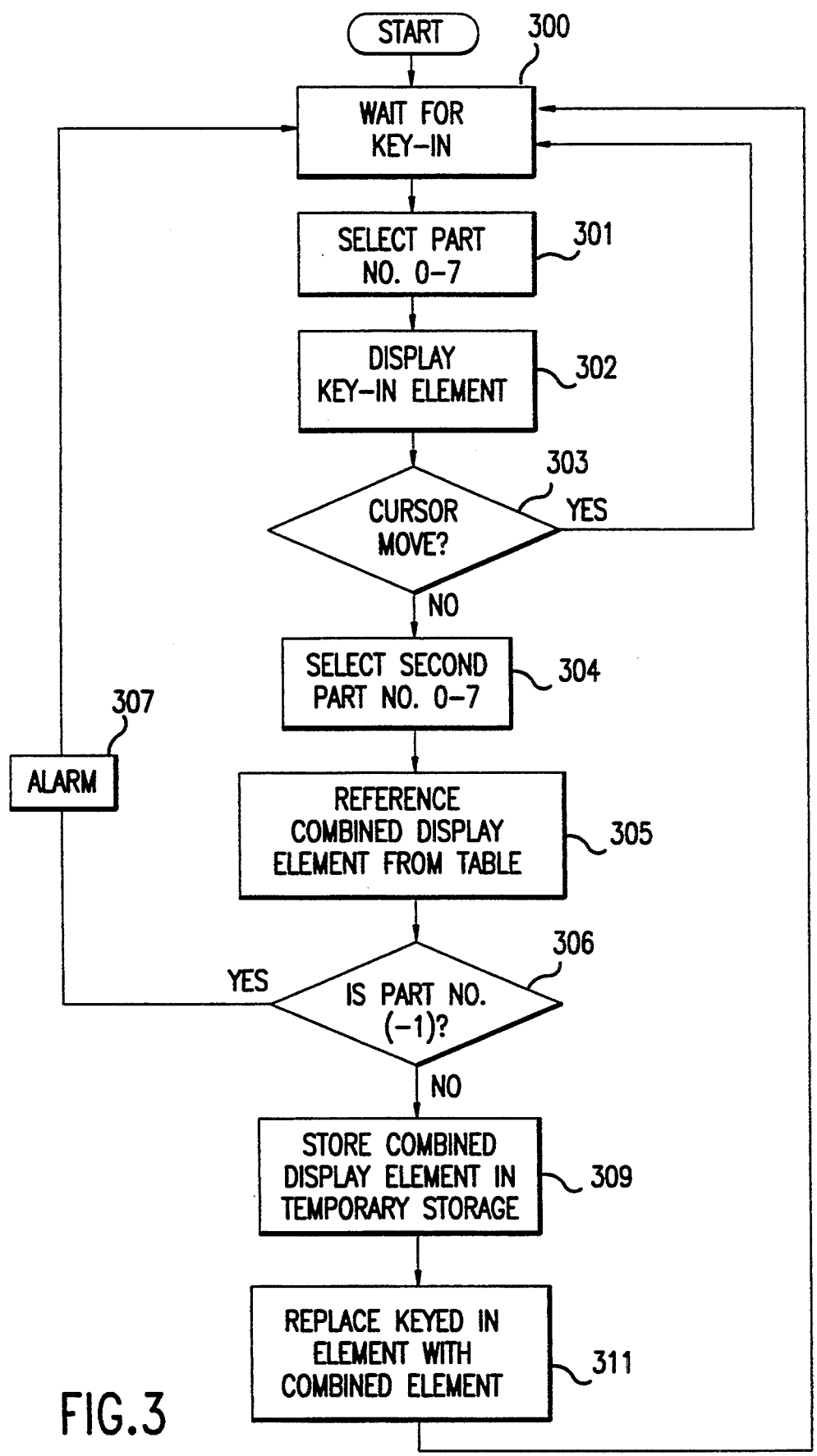
FIG. 3 is a flow diagram representing the implementation of the first embodiment of the invention.
Figure 4:
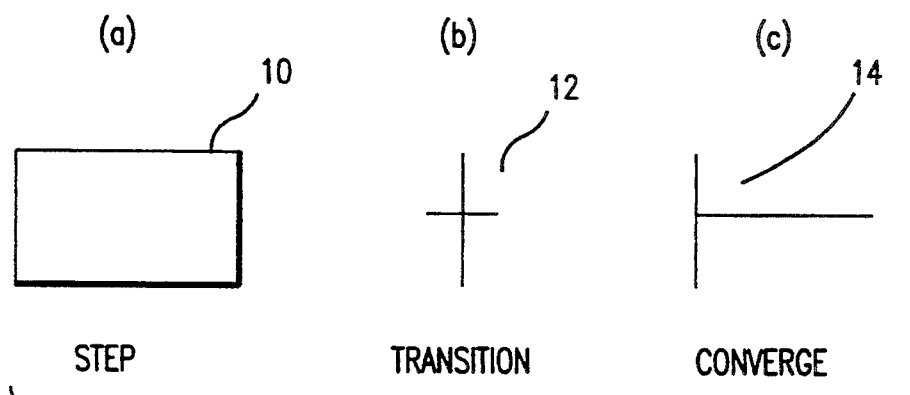
FIG. 4(a)-(c)/represent prior art display elements.

Referring now to FIG. 2, a combination table is illustrated which is used, in accordance with the program of FIG. 3, to create the compressed display. More particularly, FIG. 2 illustrates a table 200 whose elements are defined by a first vertical column of display elements 202 and a second row of display elements 204. By use of the table, the display of two elements in a single display is achieved whereby previously only one element had been possible.

In use, the vertical column shows uncombined SFC fundamental elements that are to be designated first by a user. The horizontal row 204 represents the same SFC fundamental elements as in column 202. The row elements 204 are to be designated as a second input by the user such that the element would be displayed below the first entered element in a display area. Thus, FIG. 2 illustrates the various combinations 206 which can be combined by inputs 202 and 204. In FIG. 2, the symbol (−1) indicates that a logically impossible combination has been entered (i.e. two transitions). The selected combination element is then stored in an area of the computer memory.

Referring now to FIG. 3, a flow chart illustrating the sequential operation of the first embodiment of the invention is shown. At step 300 the system awaits a first key-in of the SFC input. At step 301, the key-in occurs by selecting a function key, where the user then selects a numeric key to represent the part number of the selected SFC fundamental display element. For example, the user may input a "0-7" such that the system obtains a combination part number which is then referenced with the part number. At step 302 the first keyed-in SFC symbol that corresponds to "0-7" is displayed.

The monitor then waits to see if the user moves the cursor at step 303.

If the cursor is not moved when the user keys-in a second part number, at 304, the combined display element that represents the first and second display elements is selected from the table of FIG. 2 at step 305. The combined element is then tested at step 306 to determine if the combination is correct. If not, an alarm occurs at step 307 notifying the user of an error. The program then returns to step 300 to wait for a new first input from the user. However, if the combination is not in error, then the combined display is temporarily stored at step 309. At step 311, the combined display element replaces the first uncombined element on the display such that compression of the elements in a single display area results. The program then returns to step 300 to wait for another key entry.

Alternatively, if an operator wishes to display each display element uncompressed in a single display area, he must move the cursor at step 303 such that the uncompressed display remains on the screen. The program then returns to step 300 to wait for another input.

As a result, the first embodiment of the invention achieves the display of two consecutive elements in a single display area. The display of a higher quantity of SFC fundamental elements on the monitor screen can thus be achieved by compressing multiple elements into a single area. As a result, the user needs fewer key operations to program an SFC diagram on a screen. The invention also achieves a reduction in the blank areas on the screen and increases the number of SFC elements in a single screen area. All in all, operation is made more simple and display more efficient.

Although the preferred embodiment is specifically illustrated using SFC fundamental display elements, other types of data can be used that are typically represented by a standard display format. These elements include but are not limited to CAD/CAM symbols, flow chart elements, architectural elements, chemical structures, graphs, tables, etc.

Figure 6:
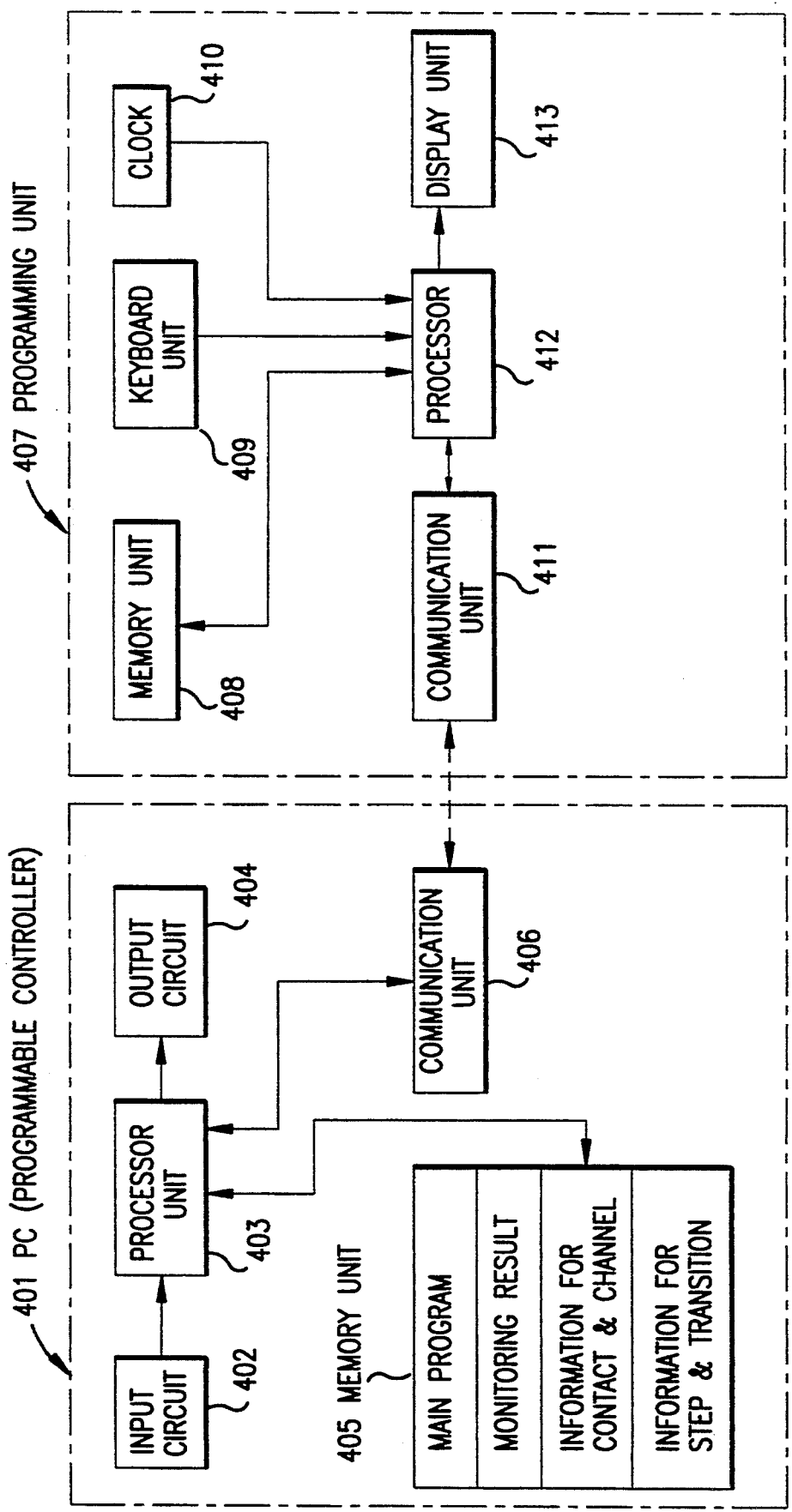
FIG. 6 a schematic block diagram representing a second embodiment of the present invention.

FIG. 6 is a block diagram representing a second embodiment of the present invention. As shown, a programmable controller 401 comprises an input circuit 402, a processor unit 403 an output circuit 404, and a memory unit 405 connected respectively to the processor unit 403. The memory unit 405 is adapted to store control programs to monitor the status of various contacts in channels controlled and sensed by the programmable controller 401 and information relating to various steps and transitions. In addition, the processor 403 executes programs stored in the memory unit 405 and performs input/output control and communication related processing through the communication unit 406.

The PC 401 is adapted to communicate with a programming unit 407. The program unit 407 consists of a memory unit 408 which is connected to a processor 412. The processor further receives information from a keyboard 409, and a clock 410. The processor is connected to a communication unit 411 which is adapted to communicate with the communication unit 406 of the PC 401. Information entered by the processor 412 is displayed on a display unit 413.

The programming unit 407 is equipped to monitor functions so that debugging can easily be accomplished during programming. The monitoring operation involves periodically sensing the conditions and status of various contacts, channels, steps and transitions during a sampling period. The identity of these elements, as well as the sampling period(s) for these elements, are entered by an operator through the keyboard unit 409. The sampled data is stored in the memory 405 of the PC unit 401.

When the system starts to monitor the various status and changes of the program, that information, which is defined by the various conditions stored in the memory unit 405, is thereby monitored periodically according to a preset time period in clock 410. After the preset monitoring time elapses, the results are transmitted from the PC 401 to the programming unit 407 which then stores the results in the memory unit 408. The data is then provided to the display unit 413.

Figure 7:
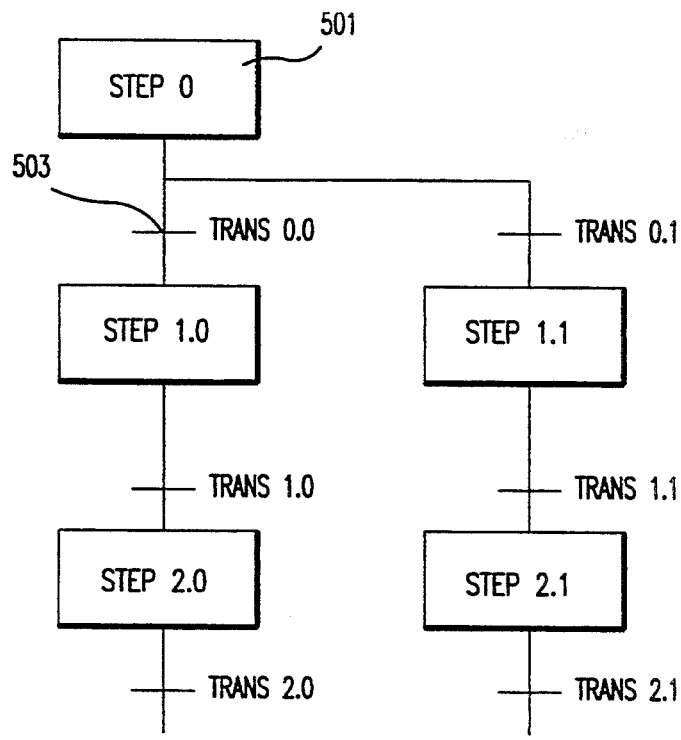
FIG. 7 is a flow chart display of the second embodiment of the present invention.

Referring now to FIG. 7, an example of a typical program that is monitored is shown. In particular, the program is represented by SFC symbols whereby a program step 501 or transition 503 each represent a single transaction such that various conditions that occur in the various contacts relating to a step or transition are defined by a single transaction element 501 or 503. The advantage of the SFC transaction format, therefore, is that it provides an efficient expression of many individual status and conditions by means of generally used transaction symbols.

Figure 8:
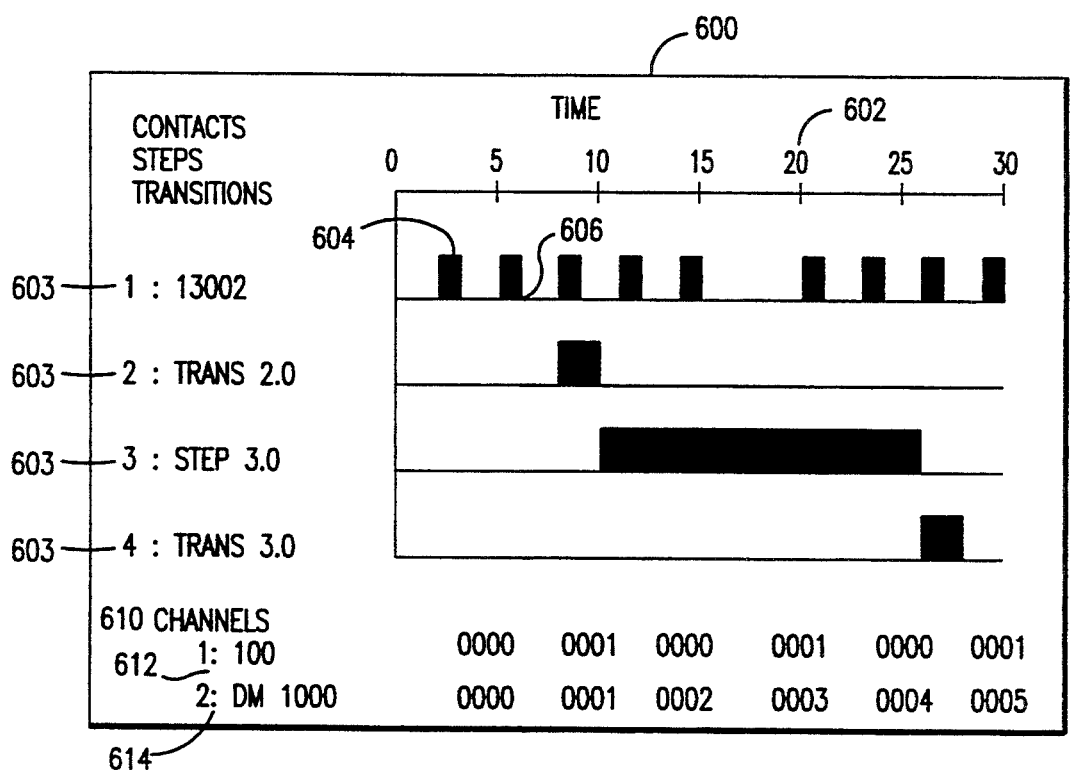
FIG. 8 is a timing chart of the display of the second embodiment of the present invention.

According to FIG. 8, a monitoring screen 600 can be used to represent the status and changes of transactions shown in the SFC program of FIG. 7 in a convenient manner. More particularly, in FIG. 8, a horizontal line 602 is provided to represent program operation cycles. For example, the cycles can be represented in units of time (such as 0–30 cycles) or in microseconds, milliseconds or seconds, etc. A time chart is illustrated wherein each row 603 represents a specific type of transaction. For example, 603-1 illustrates the contact number "13002". Row 603-2 represents the transition number "2.0"(see FIG. 7), while 603-3 and 603-4 each respectively represent a step and a transition point. The status of each of the elements 603 is respectively represented in bar graph format whereby a status for each respective cycle is represented either as an on-state 604 or as an off-state 606. A lower portion of the display 600 represents the channel status 610 where two channels 612 and 614 are each represented at a particular point in the operational cycle. The status of each channel is represented in hexadecimal format since each channel consists of plural contacts that are not readily represented by a timing chart.

Figures 10, 11:
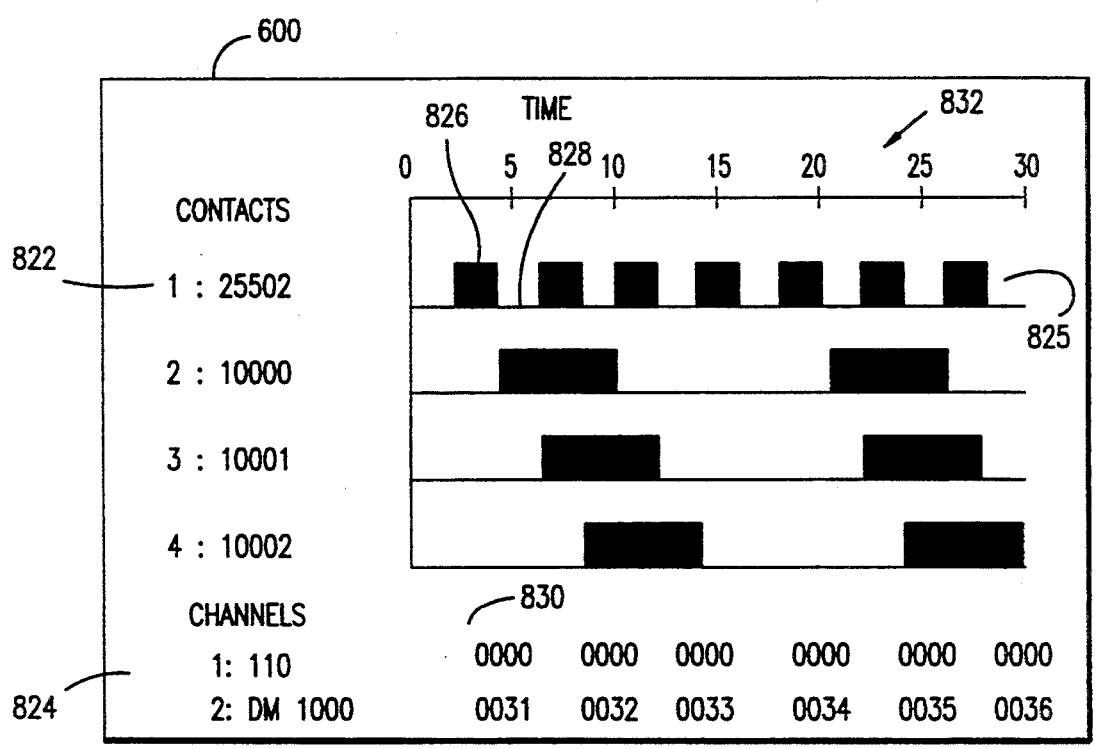
FIG. 10 is a table representing the data for the second embodiment of tie present invention.
FIG. 11 is a flow chart representing the prior art.

The advantage of the timing chart shown in FIG. 8 is that it makes it easier for an operator to determine the status of an entire program being debugged rather a time chart representing the individual program lines or contact points as shown in FIG. 11. This is because the timing chart shown in FIG. 8 can be readily compared to and contrasted with the SFC flow chart elements shown in FIG. 7. Thus, the status of each step and transition displayed on the monitoring screen can be easily correlated together with the status of the contacts and channels in the SFC program.

Figure 9:
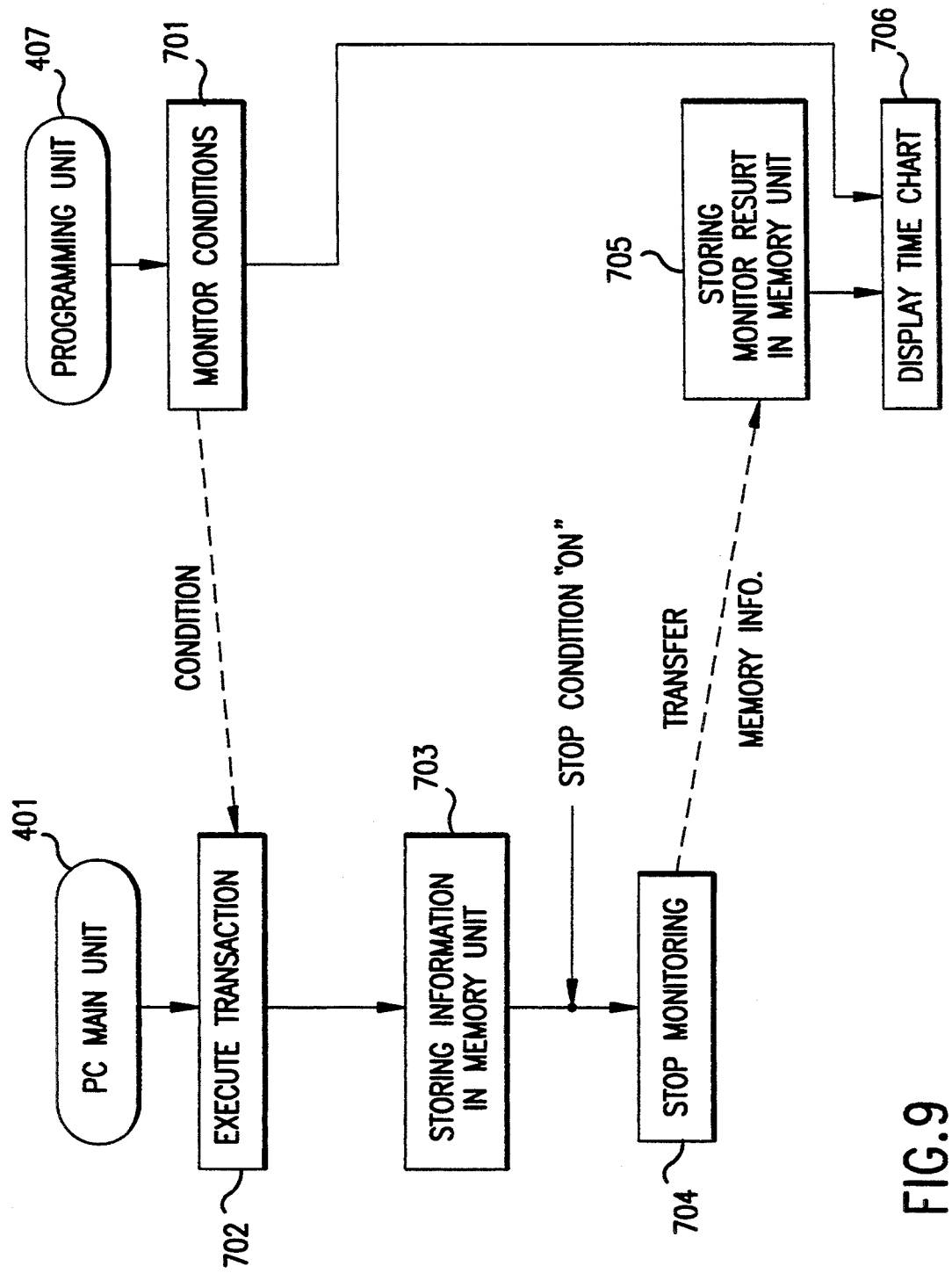
FIG. 9 is a flow chart for implementing the second embodiment of the present invention.

Referring now to FIG. 9, a functional flow chart of the operation of the programmable controller 401 in programming unit 407 is illustrated. More particularly, at a first step 701, the conditions of various contacts, channels that relate to steps, transitions are sampled and the status condition resulting therefrom are set in the programming unit 407. The results of the conditions are then communicated to the PC 401 through the communication units 411 and set respectively as shown in FIG. 6. During the transfer, the PC 401 continues to execute its various control programs and continues to control communication of the various input/output conditions.

The above monitoring transactions provided from step 701 are executed along with the other functions. During such operation, the PC 401 begins monitoring the transactions according to various conditions stored in the memory unit 405 at step 702. When the PC starts monitoring the transaction, the current status of the designated contacts, steps and transitions in each sampling interval are then stored in the memory unit 405 at step 703. Specifically, the memory unit 405 stores the status information in a time table as many times as the status checks are set by the programmer. After the PC 401 executes those transactions according to various preset conditions, monitoring stops at step 704 and the information stored in the memory unit 405 is transferred through communication units 406 and 411 to the programming unit at step 705. The data is then formatted to be represented in chart form as shown in FIG. 6 and then displayed on display unit 414 at step 706.

During execution of the program by the processor 412 in the programming unit 407, it is still possible to set a proper sampling interval so that the monitoring of transactions does not affect the other operations of the PC 401.

As previously noted, the various monitoring conditions of the contacts, channels, steps and transitions are necessary in order to debug the program. That information is first input to a keyboard 409 of the programming unit 407 so that the PC 401 can then execute the monitoring operation and process the monitoring results so that those results are then displayed on a display unit 413 in a time chart format as shown in FIG. 8.

Monitoring conditions are flexible and can be readily changed by the programmer. Various combinations of steps, transitions and individual contacts can thereby be respectively monitored. As a result, the present invention enables an operator to significantly reduce the debugging time of a program, since programmers can more readily debug a program on a step-by-step basis tied in with the program logic chart. The monitoring unit is thereby ultimately practical for monitoring SFC or any other kind of symbols representing discrete program functions.

FIG. 10 illustrates the operational cycle status of the various transaction elements (shown in the columns, rows or in the various channels). FIG. 10 is illustrative of the memory table organization used in the present invention. The data illustrated in FIG. 10 does not correlate with the data shown in FIG. 8 and 11.

The advantage of the second embodiment of the invention, is that a means to select designated transactions in a program such as steps and transitions and a means for easily checking the functional status of the transactions and transitions periodically during operation of the program is readily accomplished. The memory unit then stores the various functional status and changes in the time table, as shown in FIG. 10 and that information is then displayed in time chart fashion to the user. As a result, an operator realizes an efficient tool for debugging since he is able to define exactly those specific steps and transitions to be monitored. A further advantage is that various types of information, such as the status of contacts, of channels, of transitions or any other elements contemplated, can be monitored simultaneously. As a result, the debugging of specific parts of a program representing various types of elements can be done simultaneously, saving time and expense.

Although only a second preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A programmable monitor unit which is adapted to display a sequential function chart made up of sequential function chart display elements, comprising:

display means segmented into a plurality of display areas each said display area having a plurality of areas of a predetermined vertical dimension;

input means for providing designations of said sequential function chart display elements;

memory means for storing a plurality of said designated sequential function chart display elements provided from said input means in a combination table;

comparing means wherein elements in said combination table are defined by matching first inputted sequential function chart display element with an identical element in a first column of said combination table, by matching a second inputted sequential function chart display element with an identical element in a first row of said combination table, and by designating a compressed sequential function chart display element that is at an intersection of the row and column of said matched identical elements; and selecting means for selecting said compressed sequential function chart display element from said table and providing said compressed sequential function chart display element to a respective one of said display areas of said display means such that said display means produces a compressed display of said designated sequential function chart display element.

2. A programmable monitor unit according to claim 1, wherein said sequential function chart display elements include symbols of program transitions, program steps, program converges and programs deconverges that are represented in said sequential function chart.

3. A programmable monitor unit according to claim 1, wherein said first column in said combination table comprises identically ordered display elements in identical positions to said first row in said combination table.

4. A programmable monitor unit according to claim 1, further comprising storing means for storing the compressed display elements following said selection from said memory means.

5. A programmable monitor unit according to claim 1, further comprising an alarm means for displaying a visual indication of a symbol representing an illegal combination on said display means, said alarm indicating that said inputted first and second sequential function chart display elements cannot be selected by said selecting means.

6. A programmable monitor unit according to claim 1, wherein a sequential function chart display element is selected by a user by inputting a reference number associated with a pre-stored sequential function chart display element so that a sequential function chart display element associated with said reference number is produced.

7. A programmable monitor unit according to claim 1, further comprising a cursor means which is moved by a user across said display means.

8. A programmable monitor unit according to claim 7, further comprising an access means for accessing said memory means only after a user has inputted said first sequential function chart display element and has not moved said cursor means such that when a second inputted sequential function chart display element is inputted, said first and second inputted sequential function chart elements are compared to said comparing means.

9. A programmable monitor unit according to claim 8, further comprising cursor testing whereby when said cursor is moved following input of said first sequential function chart display element, a second display element associated with said second inputted sequential function chart display element is then displayed in an uncompressed format below said first input.

* * * * *